(No Model.)
G. W. KNOWLTON.
ROD PACKING.
No. 487,019.  Patented Nov. 29, 1892.
Fig. 1.   Fig. 2.   Fig. 3.
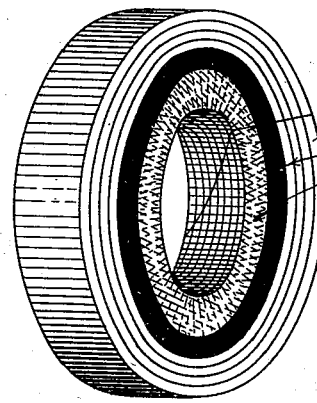
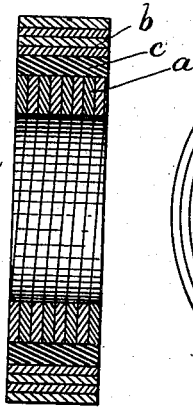
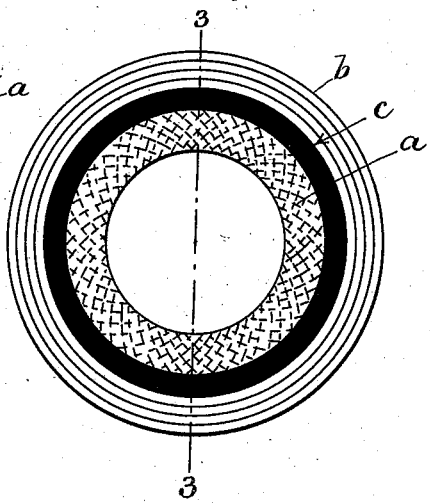
Fig. 4.
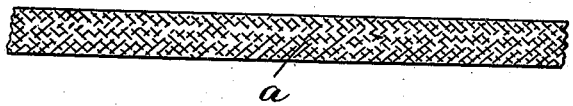
WITNESSES.
Alec F. Macdonald.
H. Brown
INVENTOR.
G. W. Knowlton
by Knight Brown Crosley
Attys.

UNITED STATES PATENT OFFICE.

GEORGE W. KNOWLTON, OF BOSTON, MASSACHUSETTS.

ROD-PACKING.

SPECIFICATION forming part of Letters Patent No. 487,019, dated November 29, 1892.

Application filed June 13, 1892. Serial No. 436,426. (No model.)

*To all whom it may concern:*

Be it known that I, GEORGE W. KNOWLTON, of Boston, in the county of Suffolk and State of Massachusetts, have invented certain new and useful Improvements in Piston-Rod Packings and the Method of Making the Same, of which the following is a specification.

This invention has for its object to provide a permanently formed or molded piston-rod packing of ring form, composed in part of rubber and adapted to preserve a tight joint and compensate for wear of the rod, as well as for depressions caused by defects in a worn rod.

The invention consists in a packing composed of a ring permanently formed or molded to fit a piston-rod and comprising in its construction, first, an inner section composed of a strip or strips of duck or other suitable fibrous material cut bias and arranged in the form of a helix, its convolutions being placed with their flat sides in contact with each other, cemented together and molded, so as to form a tube adapted to encircle the piston-rod, the inner edges of the convolutions collectively forming the internal surface of the tube, which bears upon the rod and presenting a crossed-edge surface composed of the ends of the threads of the fabric, as the wearing-surface; second, a section composed of partially-vulcanized, compressed, and molded rubber arranged as a ring, covering the outer surface of the first-named or inner section, and, third, an outer section of any suitable material and construction adapted to protect the rubber section, said outer and inner sections being preferably saturated with a suitable lubricant to render them pliable.

The invention also consists in certain improvements in the method of making ring packing, all as hereinafter described.

In the accompanying drawings, forming a part of this specification, Figure 1 represents a perspective view of a ring packing embodying my invention. Fig. 2 represents a side elevation of the same. Fig. 3 represents a section on line 3 3, Fig. 2. Fig. 4 represents a part of the fibrous strip from which the inner section of the packing is made.

The same letters of reference indicate the same parts in all of the figures.

In carrying out my invention I make a packing composed of an inner section $a$, an outer section $b$, and an intermediate section $c$, the inner section being formed to fit closely on the piston-rod. The inner section is composed of a strip of duck or other suitable textile fabric cut bias, as shown in Fig. 4, and wound helically around a suitable cylindrical former, the convolutions of the strip being arranged with their flat sides in contact with each other and substantially at right angles to the length of the piston-rod surrounded by the packing. The inner edges of the convolutions comprising one edge of the strip from which the convolutions are made constitute the wearing-surface of the packing and bear upon the piston-rod. The convolutions of the strip $a$ are firmly united by means of rubber or other suitable cement interposed between the convolutions during the operation of forming the same, so that the inner section is a permanently formed or molded ring adapted to fit a piston-rod, the cement being applied in a manner well known to those skilled in the art of treating rubber. The intermediate section $c$ is a continuous molded ring of partially-vulcanized rubber formed upon the outer surface of the inner section $a$. By the term "partially-vulcanized rubber" I mean rubber originally treated so that it will only be partially vulcanized by the degree of heat to which a piston-rod packing is subjected in its ordinary use. The rubber thus treated is placed in an entirely-unvulcanized condition on the inner section $a$ and forms a continuous ring of soft rubber surrounding said inner section and adhering closely thereto. The outer section $b$ may be composed of a strip of duck or other suitable textile material wound upon the exterior of the rubber section $c$, the object of the outer section being to prevent contact between the rubber and the stuffing-box and to protect the rubber. Hence it may be of any suitable construction and material. The ring made up of the three sections, as above described, is then subjected to heat and pressure in a vulcanizing mold or flask until the rubber section is partially vulcanized, or, in other words, is so changed from its condition prior to the application of heat as that it will remain comparatively soft and elastic and will at the same time resist the heat to which the packing is subjected when in use without being either melted or vulcanized to hardness thereby. The pressure to which the packing is subjected while the rubber is being partially vulcanized firmly unites the rubber section to the outer and inner sections and compresses the rubber, so that it is partially vulcanized in a compressed condition and immediately expands when put to use on a piston-rod. Hence the packing can be tightened or forced into place by a light pressure, such as can be exerted by the fingers, and gives the highest results that can be obtained in a packing—viz., a tight joint with the least possible friction. The ring thus formed is preferably severed or cut through diagonally at one side, so that it can be enlarged or contracted.

I claim—

1. The improved rod-packing hereinbefore described, composed of a ring molded and formed to fit a piston-rod and having relatively-inelastic inner and outer sections and an intermediate elastic section of partially-vulcanized rubber, said rubber being in a partially-compressed state, as set forth.

2. The improved ring packing hereinbefore described, the same consisting of three parts, namely: first, the permanently formed or molded inner section made of a strip or strips of textile fabric cut bias and arranged in layers or convolutions, forming a tube, the sides of the layers or convolutions being cemented together and arranged substantially at right angles with the length of the rod encircled by the packing, while their inner edges collectively constitute the wearing-surface of the packing and present the ends of the threads at said surface; secondly, the intermediate section or continuous molded ring of partially-vulcanized rubber inclosing the inner section, said rubber being in a partially-compressed state, and, thirdly, an outer section adapted to protect the rubber, the convolutions of both the inner and outer sections being saturated with a lubricant, as set forth.

3. The improved method hereinbefore described of making ring packing, the same consisting in interposing between relatively-inelastic ring-shaped inner and outer sections a continuous ring-shaped section of unvulcanized rubber prepared to be only partially vulcanized by the degree of heat to which the packing is to be subjected when in use, the whole forming a three-part continuous ring, and subjecting said ring to heat and pressure, the degree of heat being such as to leave the compressed rubber in a partially-vulcanized condition, as set forth.

In testimony whereof I have signed my name to this specification, in the presence of two subscribing witnesses, this 31st day of May, A. D. 1892.

GEORGE W. KNOWLTON.

Witnesses:
C. F. BROWN,
J. MARTIN ALLEN.